United States Patent [19]

Fulghum et al.

[11] Patent Number: 4,561,643
[45] Date of Patent: Dec. 31, 1985

[54] RACK ASSEMBLY

[75] Inventors: Donald R. Fulghum, Canton; Ronald C. Muir, Whitmore Lake, both of Mich.

[73] Assignee: Ford Motor Company, Dearborn, Mich.

[21] Appl. No.: 678,845

[22] Filed: Dec. 6, 1984

[51] Int. Cl.$^4$ ............................................. B25B 1/20
[52] U.S. Cl. ........................................ 269/43; 269/46; 269/111
[58] Field of Search ............... 269/43, 46, 71, 111; 118/500, 503; 211/186, 188, 189, 194, 195; 432/253

[56] References Cited

U.S. PATENT DOCUMENTS

| | | | |
|---|---|---|---|
| 2,057,569 | 10/1936 | Goodwillie | 269/46 |
| 3,341,191 | 9/1967 | Pianowski | 269/46 |
| 4,324,393 | 4/1982 | Chausse | 269/46 |
| 4,371,106 | 2/1983 | Chapman | 269/46 |

*Primary Examiner*—Robert C. Watson
*Attorney, Agent, or Firm*—William E. Johnson; Cliffod L. Sadler

[57] ABSTRACT

This specification is directed to a rack assembly (40) used in the vacuum brazing of aluminum heat exchangers (10). The rack assembly of this invention includes an upper rack support structure (42) having front (44) and rear (46) facing portions. A pair of rails (48—48) are mounted from the upper rack support structure so that the pair of rails extend from the front facing portion to the rear facing portion thereof in a spaced-apart relationship. The spacing (50) between the pair of rails is sufficient that fluid tubes and fin strips of a heat exchanger can pass therethrough while an upper header member thereof is supported on opposite sides of the pair of rails. An upper locking structure holding device (52) is mounted on the rear facing portion of the pair of rails for holding a locking structure (66) therein. A releasable locating structure holding device (54) is mounted on the front facing portion of the pair of rails for releasably holding a locating structure therein (78). A lower rack support (56) has front (58) and rear (60) facing portions thereon. A lower locking structure device is mounted on the rear facing portion of the lower rack support structure while a lower locating structure is mounted on the front facing portion of the lower rack support structure.

2 Claims, 7 Drawing Figures

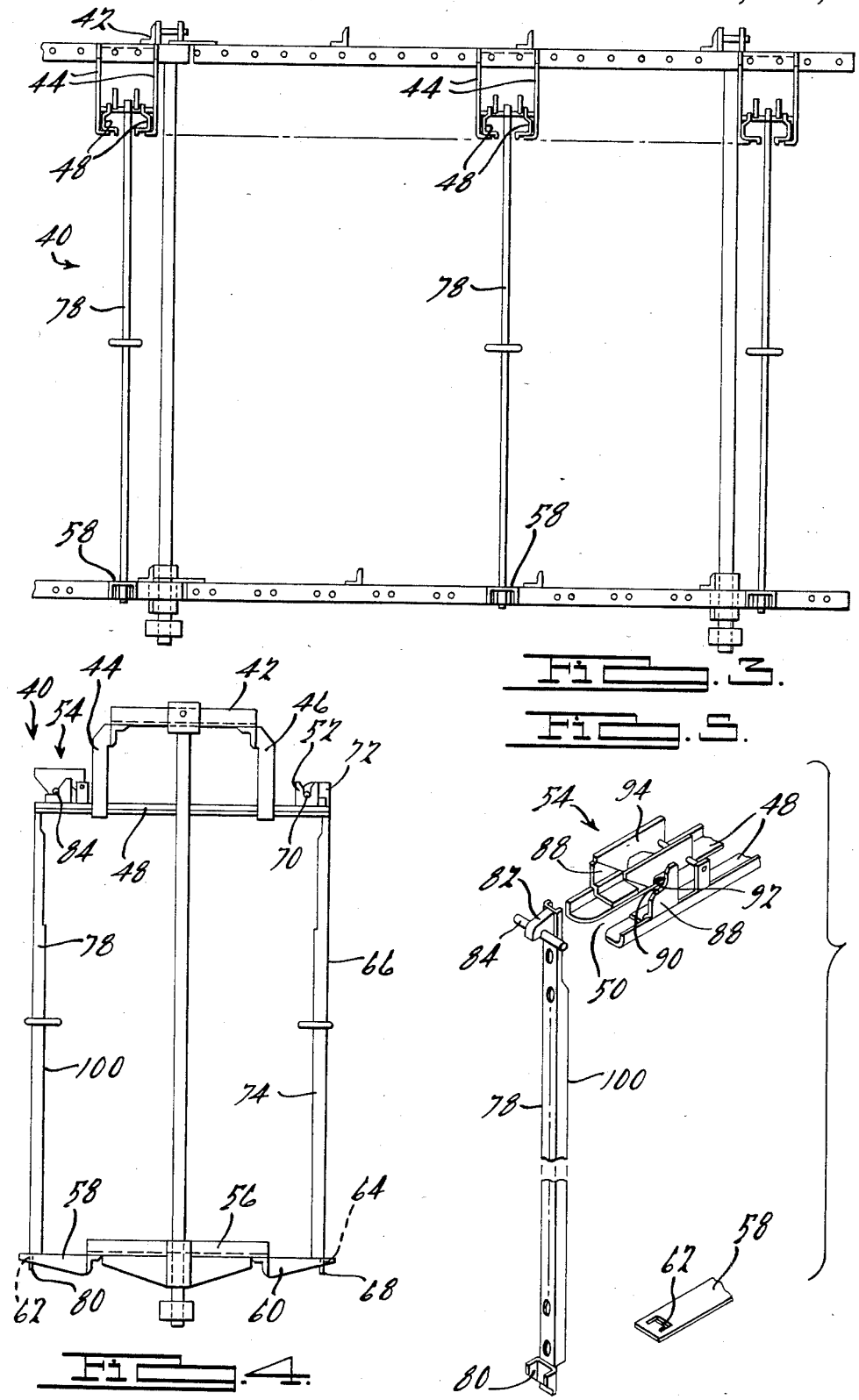

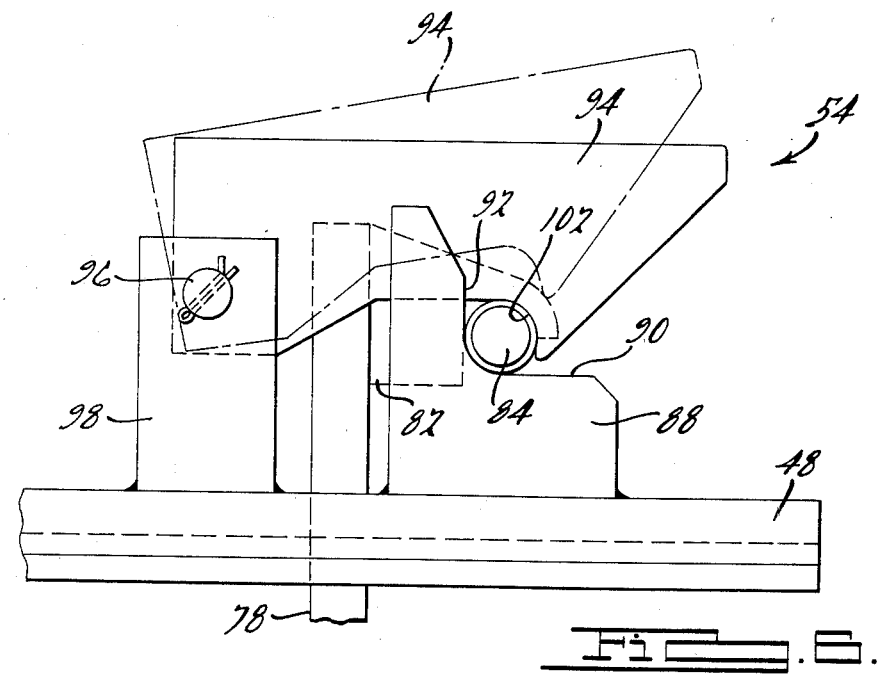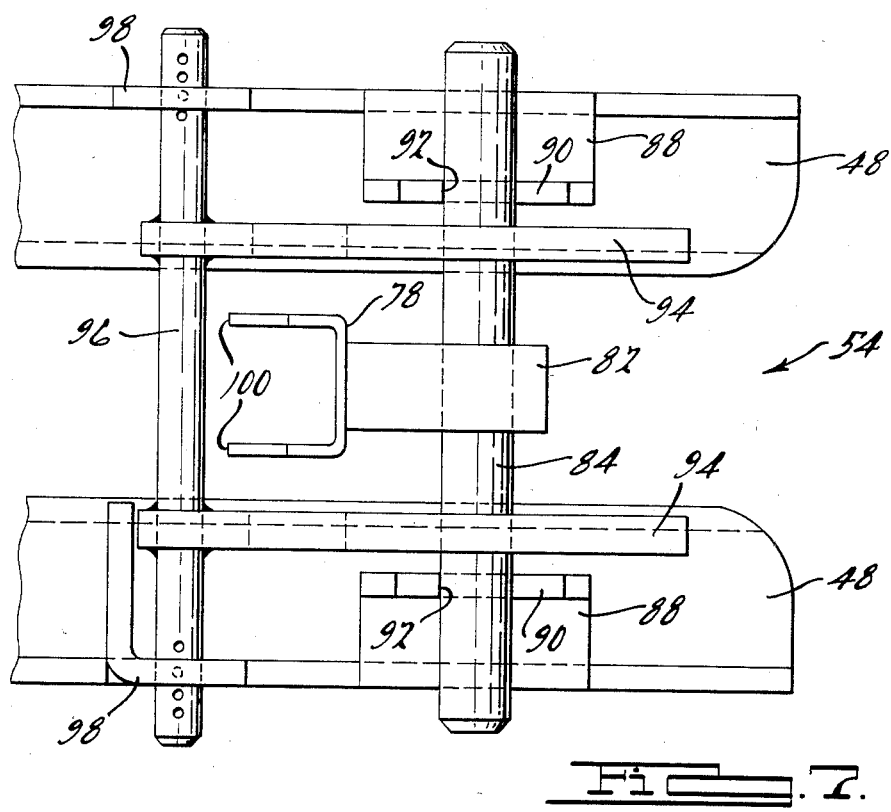

RACK ASSEMBLY

TECHNICAL FIELD

This application is directed to a rack assembly and, in particular, is directed to a rack assembly used in the vacuum brazing of aluminum heat exchangers. The rack assembly disclosed herein is one which is easily loaded with an aluminum heat exchanger to be brazed and that heat exchanger is locked securely in the rack assembly by structure which is relatively easy to assemble about the heat exchanger.

BACKGROUND AND PRIOR ART STATEMENT

No search was conducted on the subject matter of this specification in the U.S. Patent and Trademark Office or in any other search facility.

The vacuum brazing of aluminum heat exchangers is a process well known by skilled artisans. Basically, the aluminum used to form the aluminum heat exchangers is one which has an alloy of aluminum on the surface thereof. When the aluminum alloy is exposed to a vacuum at a relatively high brazing temperature, the surface aluminum flows so that a braze is formed between adjacent aluminum components forming the heat exchanger. In the past, Ford Motor Company has manufactured millions of aluminum heat exchangers used as evaporators for air conditioning systems. Such evaporators are relatively compact heat exchangers.

Ford Motor Company now desires to make vehicle radiators out of aluminum. Such vehicle radiators generally are relatively long in dimensions perpendicular to the direction of airflow therethrough, but relatively thin in dimension with respect to the direction of the airflow therethrough. Thus, the aluminum heat exchangers which are used as radiators in vehicles generally tend to have rather large X and Y dimensions, whereas their Z dimension or depth dimension in the direction of airflow is relatively shallow.

Because of such large dimensions in two directions and a shallow dimension in one direction, difficulty is encountered in manufacturing such heat exchangers in a vacuum brazing operation. Basically, the difficulty is encountered because most of the individual elements making up the assembly are not rigidly bonded to one another prior to the vacuum brazing operation. Thus, the various elements making up the final heat exchanger must be held together carefully prior to the vacuum brazing operation so that the vacuum brazing operation may effect a bonding between the various elements thereof.

Thus, any rack assembly used in the vacuum brazing of aluminum heat exchangers, such as heat exchangers used in automotive vehicles, must be of a design which ensures that prior to the brazing operation the elements making up the aluminum heat exchanger are held in a relatively fixed position and fully supported. Another desirable characteristic for such a rack assembly is that it should be designed so that an aluminum heat exchanger may be both loaded and unloaded rapidly from the rack assembly with a minimum of effort required on the part of the person or persons doing the loading and/or unloading.

The rack assembly of our design is one which accomplishes the desirable objectives set forth above. A first principal objective of the rack assembly of our invention is that any unbrazed aluminum heat exchanger held in our rack assembly is thoroughly supported so that all of the individual elements thereof braze together to form an acceptable finished aluminum heat exchanger. The other principal objective of our rack assembly is that unbrazed heat exchangers may be loaded easily therein and finished brazed aluminum heat exchangers may be removed easily therefrom.

DISCLOSURE OF INVENTION

This invention is directed to a rack assembly and, more particularly, to a rack assembly used in the vacuum brazing of aluminum heat exchangers. The aluminum heat exchangers when subjected to a brazing operation are oriented in such a manner as to have a plurality of verticle fluid tubes intermixed with a plurality of verticle fin strips in a side-by-side relationship. The plurality of fluid tubes are in fluid communication at opposite ends thereof with horizontal header members. At least an upper one of the header members has a width dimension sufficiently large that the upper header member extends in its width dimension to a width greater than the width dimension of the fluid tubes and the fin strips.

In accordance with the teachings of this invention, the rack assembly of our design includes the following structure. An upper rack support structure is provided having front and rear facing portions. A first mounting structure mounts a pair of rails from the upper rack support structure. The first mounting structure mounts the pair of rails so that the pair of rails extend from the front facing portion of the upper rack support structure to the rear facing portion thereof in a spaced-apart relationship. The spacing between the pair of rails is sufficient so that the fluid tubes and fin strips of a heat exchanger can pass therethrough while an upper header member thereof is supported on opposite sides thereof by the pair of rails.

An upper locking structure holding device is mounted on the rear facing portion of the pair of rails. This upper locking structure holding device is provided for holding a locking structure therein. A releasable locating structure holding device is mounted on the front facing portion of the pair of rails. This releasable locating structure holding device is for releasably holding a locating structure therein.

A lower rack support structure is provided which has both front and rear facing portions thereon. A lower locking structure holding device is mounted on the rear facing portion of the lower rack support structure. A lower locating structure holding device is mounted on the front facing portion of the lower rack support structure.

A locking structure is provided which defines a fixed stop surface. The locking structure and fixed stop surface defined thereon extend between the upper locking structure holding device and the lower locking structure holding device. The stop surface of the locking structure is engagable with a rear verticle surface on a heat exchanger suspended between the pair of rails to position the suspended heat exchanger in the rack assembly.

A locating structure is provided which defines a fixed locating surface thereon. The fixed locating surface of the locating structure extends between the upper releasable locating structure holding device and the lower locating structure holding device. The fixed locating surface of the locating structure is engagable with a front verticle surface on a heat exchanger suspended between the pair of rails to position and to locate the suspended heat exchanger in the rack assembly.

In accordance with some details of the rack assembly of this invention, the releasable locating structure holding device includes a pair of ramp members, one associated with each of the pair of rails. A pivoting latch member is secured between the pair of rails and cooperates with the pair of ramp members to define the releasable locating structure holding device. A locking pin is attached to an upper portion of the locating structure. The locking pin is movable over the ramp members of the releasable locating structure holding device to a position where the locking pin is gripped by the pivoting latch member. When these two elements are in locking contact, the locating structure is secured in its proper position in the rack structure, thereby to position and to locate the suspended heat exchanger in the rack assembly.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout several figures, which:

FIG. 3 is a front elevation view of a rack assembly in accordance with the teachings of this invention;

FIG. 4 is a side elevation view of a single one of the rack assemblies of our invention;

FIG. 5 is a perspective view, in elevation, of the locating structure and structure for releasably attaching that structure to the rack assembly of our invention;

FIG. 6 is a side elevation view of the releasable locating structure holding device associated with the rack structure of our invention; and FIG. 7 is a top view of the releasable locating structure holding device of FIG. 6.

BEST MODE AND INDUSTRIAL APPLICABILITY

The following description is what we consider to be a preferred embodiment of the rack assembly of our invention. The following description also sets forth what we now contemplate to be the best mode of constructing our inventive rack assembly. This description is not intended to be a limitation upon the broader principles of this construction, and while preferred materials are used to form the construction in accordance with the requirements of the laws, it does not mean that other materials cannot be used to make this construction.

This invention is directed to a rack assembly used in a vacuum brazing operation for brazing together of aluminum elements in order to make an aluminum heat exchanger. In particular, the rack assembly of our invention has particular utility in forming aluminum heat exchangers, generally designated by the numeral 10 in FIGS. 1-2. These aluminum heat exchangers, in the preferred embodiment, are used as radiators for automotive vehicles.

Figure 1:
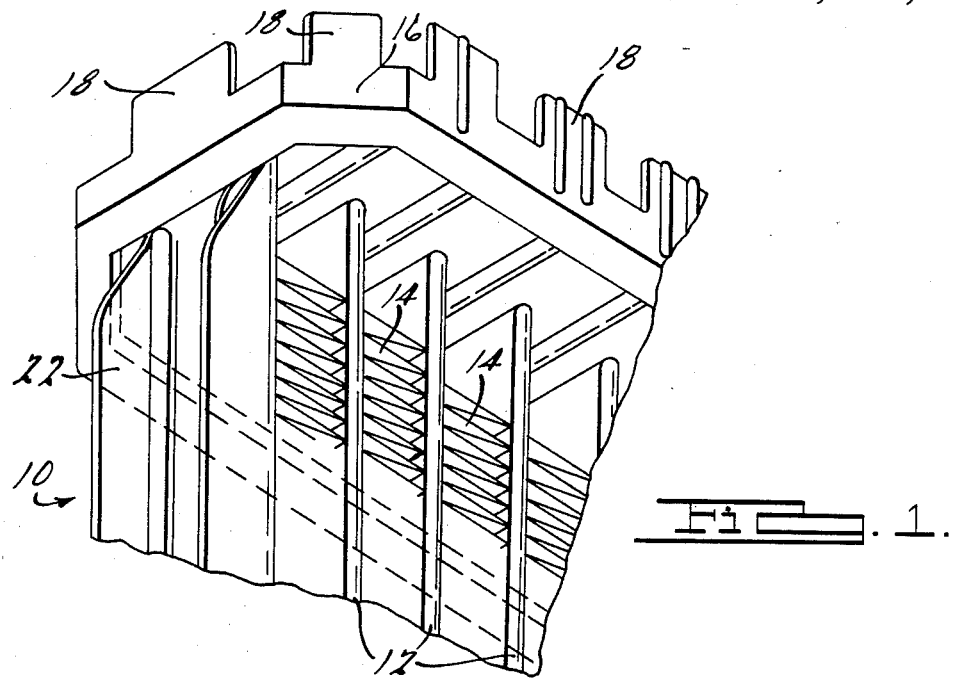
FIG. 1 is a perspective view of a portion of an aluminum heat in this case an automotive heat exchanger.
Figure 2:
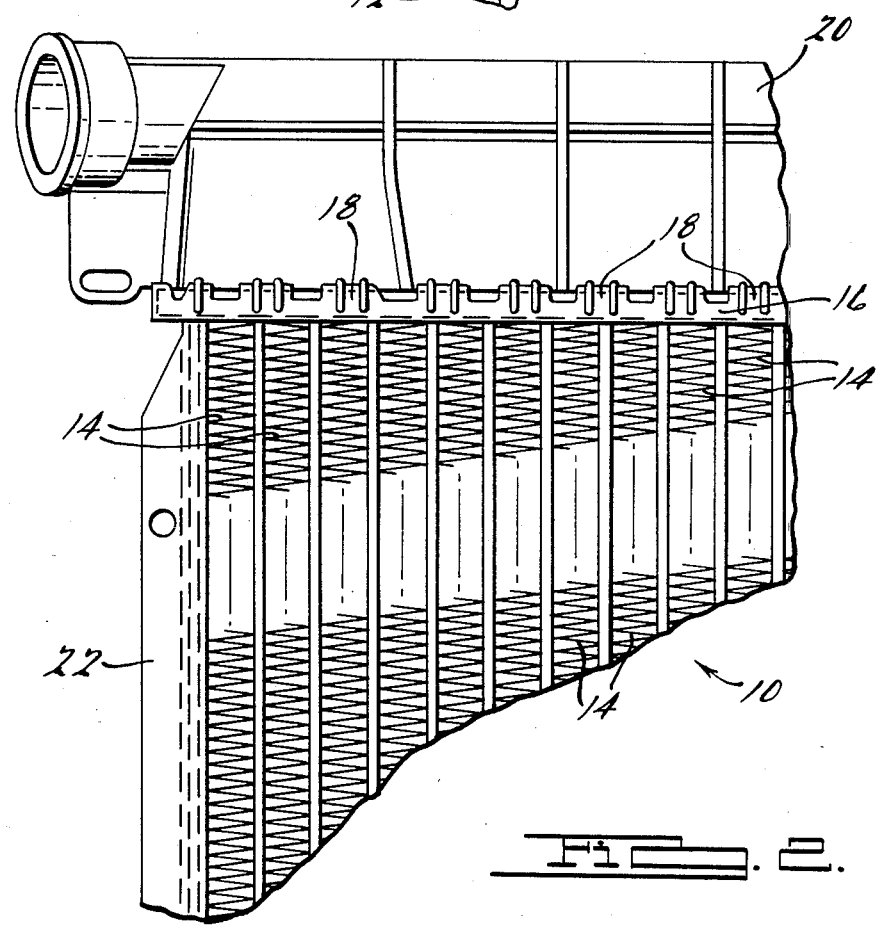
FIG. 2 is an elevation view of the heat exchanger of FIG. 1 assembled to a plastic fluid containing and conducting device to form a radiator.

These radiators generally have extended X and Y dimensions with relatively thin Z dimensions, that is, the dimension in the direction of flow of a cooling fluid therethrough. In the case of automobiles, of course, the cooling fluid is air. As best seen in FIG. 1, the heat exchanger 10, when subjected to the brazing operation, is formed of a plurality of vertical fluid tubes 12—12 intermixed with a plurality of vertical fin strips 14—14 in a side-by-side relationship. The plurality of fluid tubes are in fluid communication at opposite ends with horizontal headers 16, only the upper one being shown in FIGS. 1-2. Each header has a plurality of tabs 18—18 which may be folded over on a suitable housing 20, such as shown in FIG. 2, in order to form a completed radiator. Side members 22, only the left side being shown in FIGS. 1-2, are also provided to strengthen the overall radiator.

The rack assembly of our invention is used in a vacuum brazing operation. In such an operation, individual fluid tubes 12—12 and fin strips 14—14 along with side members 22—22 and headers 16—16 are assembled with one another in a loose manner; that is, there is no actual metal bonding between the various elements making up the construction while there may be some frictional bonding, for example, of the fluid tubes with the headers. However, all of the elements aforementioned are made from an aluminum alloy which has a coating thereon which will melt at a temperature below the melting temperature of aluminum. This is the material which brazes all of the elements together in order to form a solid unit. As is well known in the art, the brazing operation is carried out by placing the unit to be brazed in a vacuum furnace heated to a temperature in a range of 550°–1100° F. In the vacuum at the elevated temperature, the lower melting aluminum alloy melts to form the brazed joint that bonds the fin strips, fluid tubes, headers and side members into an integral unit.

The rack structure of our invention is one which provides a structure which allows easy loading of an unbrazed heat exchanger 10. The rack assembly is also one which provides excellent confinement of the unbrazed heat exchanger as it moves to and through the brazing operation so that all of the elements thereof remain in proper position for the brazing operation.

The rack assembly of our invention is generally identified by the numeral 40 in FIGS. 3-4. As best seen in these figures, an upper rack support structure 42 has a front facing portion 44 and a rear facing portion 46. A pair of rails 48-48 are mounted between the front facing portion and the rear facing portion of the upper rack structure in a spaced-apart relationship. As best seen in FIG. 4, the pair of rails extend from the front facing portion 44 of the upper rack structure to the rear facing portion 46 thereof.

A space 50, best seen in FIG. 5, exists between the pair of rails 48—48. This space is sufficiently wide that the fluid tubes 12 and fin strips 14 of the heat exchanger 10 can pass therethrough while the upper header 16 will be supported on opposite sides thereof by the rails.

An upper locking structure 52 is shown only in FIG. 4. This upper locking structure consists of two upstanding U-shaped brackets, each individually mounted on one of the pair of rails 48—48 at the rear of the rack assembly 40.

A releasable locating structure holding device, generally designated by the numeral 54 in FIGS. 4-7, is mounted on the front facing portion of the pair of rails 48—48. This device is provided for releasably holding a locating structure which will be described in greater detail hereinbelow. Similarly, the releasable locating structure holding device 54 will be also described in greater detail hereinbelow.

A lower rack support structure 56 is provided. This lower rack support structure has a front facing portion 58 thereof and a rear facing portion 60 thereof. As best seen in FIG. 3, the front facing portion 58 of the lower rack support structure 56 has an opening 62 therein. Similarly, the rear facing portion 60 of the lower rack support structure also has an opening 64 therein.

A locking structure 66, shown only in FIG. 4, has a tang 68 on the lower end thereof and a pin 70 carrying upper projection 72. The pin 70 of the upper projection 72 of the locking structure 66 is received between the pair of upper locking structures 52—52, as is best seen in FIG. 4. The tang 68 on the lower end of the locking structure 66 is received in the opening 64 of the rear facing portion 60 of the lower rack support structure. In this manner the locking structure 66 has an inwardly facing portion which defines a fixed stop surface extending between the upper locking structure 52 and the opening 64 in the rear facing portion 60 of the lower rack support structure 56. This stop surface of the locking structure is engagable with a rear vertical surface, for example, one of the side members 22—22 of the heat exchanger 10, to position a heat exchanger when it is suspended in the rack assembly 40 between the pair of rails 48—48.

A locating structure 78, best seen in FIG. 5, has a tang 80 thereon at the lower portion thereof. Tang 80 is receivable in the opening 62 of the front facing portion 58 of the lower rack support structure 56, as is depicted in FIG. 4. The locating structure 78 also has an upper projection 82 that carries a pin 84. The pin 84 is designed to engage releasably the releasable locking structure holding device, generally designated by numeral 54, which is shown best in FIGS. 5-7.

The releasable locking structure holding device 54 includes a pair of ramp members 88—88. One of each ramp member is associated with each of the pair of rails 48—48. As seen best in FIG. 6, each ramp member 88 has a horizontal surface 90 and a vertical surface 92 thereon. A pair of latch members 94—94 are rotatably mounted about a pin 96 which in turn is rotatably secured by brackets 98—98, as is best seen in FIGS. 6-7, to the front facing portion of the pair of rails 48—48.

In this manner, the latch members 94—94 are receivable over the pin 84 carried by the upper projection 82 of the locating structure 78 to lock the locating structure in its proper position in the rack 40. When in its proper position, the locating surface has a fixed locating surface 100, seen best in FIG. 7, which is engagable with a front vertical surface on a heat exchanger 10 suspended between the pair of rails 48—48 to position and to locate the suspended heat exchanger in the rack assembly. Generally, the surface so engaged is one of the side members 22 of the heat exchanger.

The locating structure 78 is easily assembled to the rack assembly 40 by merely inserting its tang 80 into the opening 62 of the front facing portion 58 of the lower rack support structure. The locating structure 78 is then swung so as to bring the pin 84 carried by the upper projection 82 thereof into association with ramp members 88—88 mounted on the pair of rails 48—48. The pin moves along the horizontal surfaces 90—90 to cam the latch members 94—94 out of the way until the pin passes under a hook portion of the latch members 102 (FIG. 6 only) and is thus latched between such hook portion and the vertical surfaces 92—92 of the ramp members.

While a particular embodiment of the invention of the rack assembly has been illustrated and described, it will be obvious to those skilled in the art that various changes and modifications may be made to the rack assembly without departing from the invention. It is intended to cover in the appended claims all such modifications and equivalents as fall within the true spirit and scope of this invention.

We claim:

1. A rack assembly used in the vacuum brazing of aluminum heat exchangers, said aluminum heat exchangers when being subjected to a brazing operation having a plurality of verticle fluid tubes intermixed with a plurality of verticle fin strips in a side-by-side relationship, said plurality of fluid tubes being in fluid communication at opposite ends thereof with horizontal header members, at least an upper one of said header members having a width dimension sufficiently large that said upper header member extends in its width dimension to a width greater than the width dimension of the fluid tubes and fin strips;

said rack assembly including:

an upper rack support structure having front and rear facing portions;

a pair of rails;

first mounting means for mounting said pair of rails from said upper rack support structure so that said pair of rails extend from said front facing portion to said rear facing portion thereof in a spaced-apart relationship, said spacing between said pair of rails being sufficient that fluid tubes and fin strips of a heat exchanger can pass therethrough while an upper header member thereof is supported on opposite sides thereof by said pair of rails;

upper locking structure holding means mounted on said rear facing portion of said pair of rails for holding a locking structure therein;

releasable locating structure holding means mounted on said front facing portion of said pair of rails for releasably holding a locating structure therein;

a lower rack support structure having front and rear facing portions;

lower locking structure holding means mounted on said rear facing portion of said lower rack support structure;

lower locating structure holding means mounted on said front facing portion of said lower rack support structure;

a locking structure defining a fixed stop surface extending between said upper locking structure holding means and said lower locking structure holding means; said stop surface of said locking structure being engagable with a rear verticle surface on a heat exchanger suspended between said pair of rails to position said suspended heat exchanger in the rack assembly; and a locating structure defining a fixed locating surface extending between said upper releasable locating structure holding means and said lower locating structure holding means; said fixed locating surface of said locating structure being engagable with a front verticle surface on a heat exchanger suspended between said pair of rails to position and to locate said suspended heat exchanger in the rack assembly.

2. The rack assembly of claim 1, wherein:

said releasable locating structure holding means includes a pair of ramp members, one associated with each of said pair of rails, and a pivoting latch member secured between said pair of rails and cooperative with said pair of ramp members; and wherein:

a locking pin is attached to an upper portion of said locating structure, said locking pin being movable over said ramp members of said releasable locating structure holding means to a position where said locking pin is gripped by said pivoting latch member to secure said locating structure in its proper position in the rack structure.

* * * * *